UNITED STATES PATENT OFFICE.

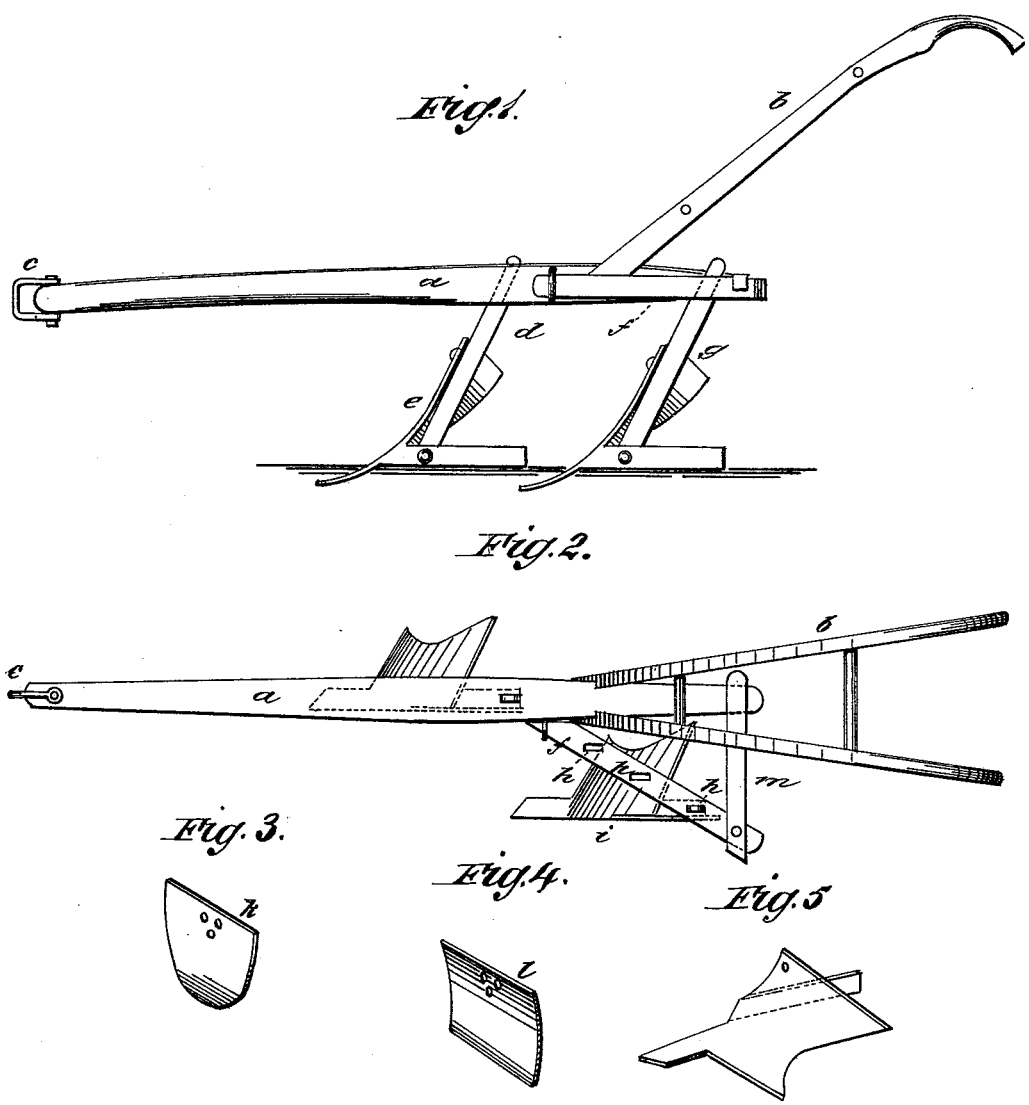

NATHANIEL H. FOSTER, OF ST. JOSEPH, LOUISIANA.

PLOW.

SPECIFICATION forming part of Letters Patent No. 234,017, dated November 2, 1880.

Application filed June 19, 1879.

*To all whom it may concern:*

Be it known that I, NATHANIEL HARRISON FOSTER, of St. Joseph, in the parish of Tensas and State of Louisiana, have invented a new and Improved Cotton Plow and Cultivator, of which the following is a specification.

My invention relates to a plow and cultivator for cotton; and its object is to lessen the work required in "molding" and "scraping out" the rows of plants, so as to leave but little work to be done with a hoe. It is particularly adapted to the cultivation of cotton in the usual way, but may be used for other purposes. An important feature of the construction is its simplicity and cheapness of manufacture.

My invention consists in a plow having a main beam with a standard carrying a plow, and an angle-beam having an adjustable standard, to which may be attached a plow or a scraper, according to the character of the work to be done.

In the drawings, Figure 1 is a side elevation of my improved cultivator having a plow attached to each standard. Fig. 2 is a plan of the same. Figs. 3, 4, and 5 are perspective views of the scrapers and plow which are used in connection with the cultivator.

Similar letters of reference indicate corresponding parts.

$a$ is the main beam of the cultivator, provided with handles $b$ and clevis $c$, of usual character.

$d$ is a standard upon the beam $a$, to which is attached the plow $e$. The plow $e$ is to be connected to the standard $d$ in any desired manner, so that it may be readily removed.

$f$ is a short angle-beam, connected to $a$ near the rear end thereof, and $m$ is a brace connecting the ends of $a$ and $f$ rigidly, so as to hold the angle-beam $f$ in position.

$g$ is a standard provided with a tenon at its upper end to pass into any one of the mortises $h$ in standard $g$, so that the standard $g$ may be set at a greater or less distance from the beam $a$.

I have shown in the drawings a second plow, $i$, attached to standard $g$, to turn the soil in the same direction as plow $e$. In that case the plow $e$ does the molding—that is, throws the dirt to the plants—and the plow $i$ following turns another furrow.

If a left-hand plow be placed upon the standard $d$ and a right-hand plow upon $g$, they will turn a furrow toward the row from each direction, or, if reversed in position, their action will be in a contrary direction. Fig. 5 shows a left-hand plow adapted for the work described.

The sweep $k$ (shown in Fig. 3) is intended for attachment to the forward standard, $d$, and in use the plow $i$, following the sweep $k$, will throw up a furrow after the sweep.

$l$, Fig. 4, is a scraper intended for use upon standard $g$ of the angle-beam $f$ and in connection with the plow $e$. In this case the scraper $l$ will scrape out the cotton, leaving it ready for cutting out to a "stand." The work to be done with a hoe is thereby much lessened.

By the use of the above-described cultivator each row of plants is worked upon both sides at once, and the adjustable standard upon the angle-beam permits the width between the two standards to be regulated at pleasure or according to the necessities of the work.

I do not limit myself to the form or character of the plows and implements used upon the beam and standards, as they may be of any desired character.

I am aware that angle-arms with several plows or a gang of plows or shovels upon each side of the beam, and rendered adjustable within certain limits, have been before employed. I am also aware that rigid angle-arms have been employed in series, each arm carrying one or more plows. I am further aware that slots in the angular arms have been formed to receive the shanks of plows or cultivators held in position by nut and screw, and any such constructions are not sought to be covered, broadly, in this application.

The sockets $h$ in my invention are so arranged as to correspond with the rows desired to be formed or cultivated, and adjustability is not an important feature. By avoiding the necessity of adjustment and adapting these holes or sockets $h$ to correspond with the work to be accomplished I secure a result in a cheaper manner by simplifying the construction of the device. Also, by using the square sockets thus adapted, the plow-shank bears upon every side and forms a very secure bearing, while in the slotted construction the bearing is only upon two sides, and the quality of the work, forcibly meeting obstructions, &c., render the shank liable to slip in the slot. It will also be observed that a slot of the necessary length would greatly weaken the arm.

Having thus described my invention, I claim as new and desire to secure by Letters Patent—

In a plow or cultivator, the combination of the main beam $a$, having the fixed standard $d$, with the oblique rear branch beam, $f$, having the rectangular mortises $h$, formed parallel with the line of draft, the adjustable standard $g$, arranged to fit in either of said mortises, and the cross-brace $m$, substantially as shown and described.

NATHANIEL HARRISON FOSTER.

Witnesses:
C. G. NICHOLS,
GEORGE MOORE.